United States Patent

[15] 3,638,933

Burnette et al.

[45] Feb. 1, 1972

[54] PRECISION X-Y POSITIONING TABLE

[72] Inventors: Robert W. Burnette, Berkeley; Harold L. Hoffman, San Pablo; Richard V. Lukes, El Cerito, all of Calif.

[73] Assignee: Yosemite Laboratory

[22] Filed: Aug. 10, 1970

[21] Appl. No.: 69,510

[52] U.S. Cl. ..................................269/60, 269/309, 108/137
[51] Int. Cl. ..........................................................B23q 3/18
[58] Field of Search ................108/20, 137, 143; 269/58, 60; 248/23; 351/38

[56] References Cited

UNITED STATES PATENTS 3,046,006 7/1962 Kulicke, Jr. ..............................269/60
3,337,732 8/1967 Opocensky ..........................269/60 X

*Primary Examiner*—James C. Mitchell
*Attorney*—Eckhoff and Hoppe

[57] ABSTRACT

An X-Y positioning table assembly having a lead screw for advancing a follower to position at least one table or stage, the axis of the lead screw being slightly misaligned relative to the direction of stage travel, said assembly further comprising means interconnecting the follower with the table or stage as to allow the follower to be rotated, the axial misalignment of the lead screw producing a rotation of the follower to compensate for cumulative lead error in the lead screw. Additionally, a resilient member interconnects the follower with the table or stage, said member being vertically flexible to accommodate a slightly bowed lead screw and prevent a binding of parts in the positioning mechanism.

11 Claims, 7 Drawing Figures

INVENTORS
ROBERT W. BURNETTE
HAROLD L. HOFFMAN
RICHARD V. LUKES
BY
Eckhoff and Hoppe
ATTORNEYS INVENTORS
ROBERT W. BURNETTE
HAROLD L. HOFFMAN
RICHARD V. LUKES
BY Eckhoff and Hoppe
ATTORNEYS INVENTORS
ROBERT W. BURNETTE
HAROLD L. HOFFMAN
RICHARD V. LUKES
BY Eckhoff and Hoppe
ATTORNEYS

PRECISION X-Y POSITIONING TABLE

This invention relates to positioning tables and, more particularly, to improved mechanism for imparting a movement from a lead screw to a positioning table or stage that assures constant and accurate positioning despite slight inaccuracies in the lead screw.

Precision X-Y tables, or stages, are employed in a wide variety of industrial applications. In general, they are utilized for accurately positioning and indexing parts in such fields as photogrammetry and the manufacture of semiconductors, In each of these applications the tables or stages are positioned by a mechanism which usually includes a hardened lead screw that is precision ground to close tolerances. Even so, many lead screws, especially the less expensive ones, possess slight inaccuracies which make it difficult to index the table with true precision. For example, the pitch of the lead screw may possess a cumulative lead error of more than several thousandths inch in 6 inches of travel. A second fault or deficiency commonly found is that the lead screw may be slightly bowed, causing the follower assembly to move up and down and/or become slightly canted as the screw rotates, resulting in a binding of parts.

It is, therefore, one principal object of the present invention to provide mechanism comprising a lead screw and follower assembly for an X-Y positioning table and more particularly wherein the axis of the lead screw may be, and usually is, purposely misaligned relative to the direction of stage travel to compensate for cumulative errors resulting from inaccuracies in pitch.

A still further object is to provide apparatus of the kind described including positioning mechanism that may be operated with less costly lead screws having known inaccuracies.

Other objects of the present invention will become apparent in view of the following detailed description and the accompanying drawings.

In the drawings forming a part of this application and in which like parts are identified by like reference numerals throughout the same, FIG. 1 is a perspective and partly exploded view of an X-Y positioning table and an actuating mechanism constructed in the preferred embodiment of the present invention;

Figure 7:
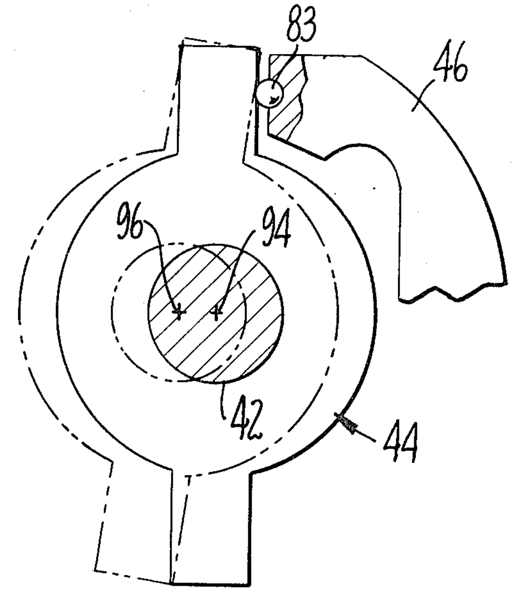

FIG. 7 schematically illustrates the manner in which the follower assembly is positioned by an axial misalignment of the lead screw to compensate for errors in pitch.

Figure 1:
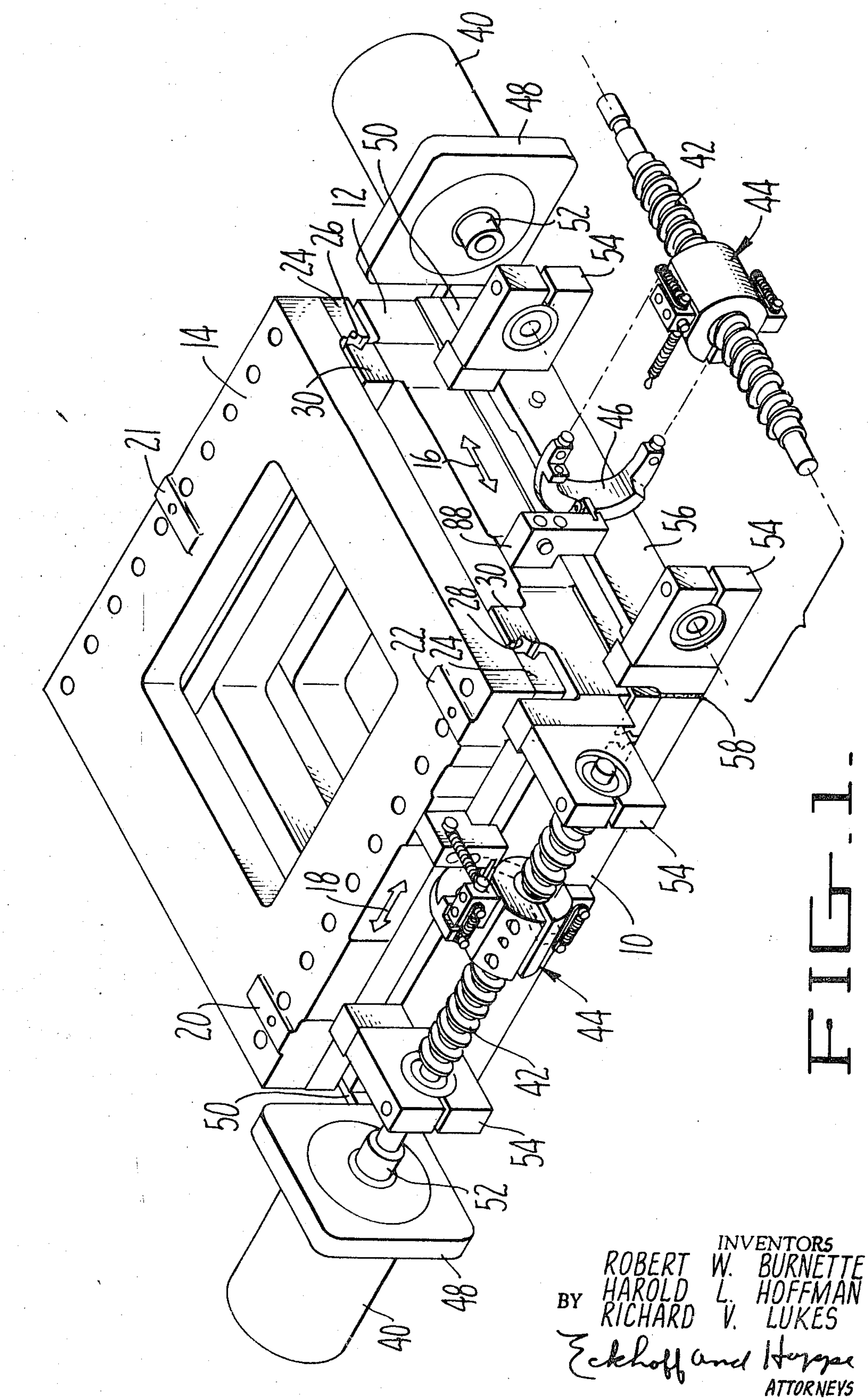

With particular reference to FIG. 1, the X-Y positioning table shown comprises a stationary base 10, a first movable stage or table 12 positioned immediately above the base and a second movable stage or table 14 positioned above the first stage. Stages 12 and 14 are each mounted for reciprocal travel in directions at right angles to the other, as indicated by the arrows 16 and 18, respectively. Base 10 and tables 12, 14 are formed with central openings or cutouts that provide access beneath the indexing plane of the apparatus and allow equipment manufacturers to install the tables into their own custom designed system. In addition, three lugs 20,21 and 22, each formed on the upper surface of second stage 14, provide means for mounting special manufacturing fixtures (not shown).

Figures 2, 3:
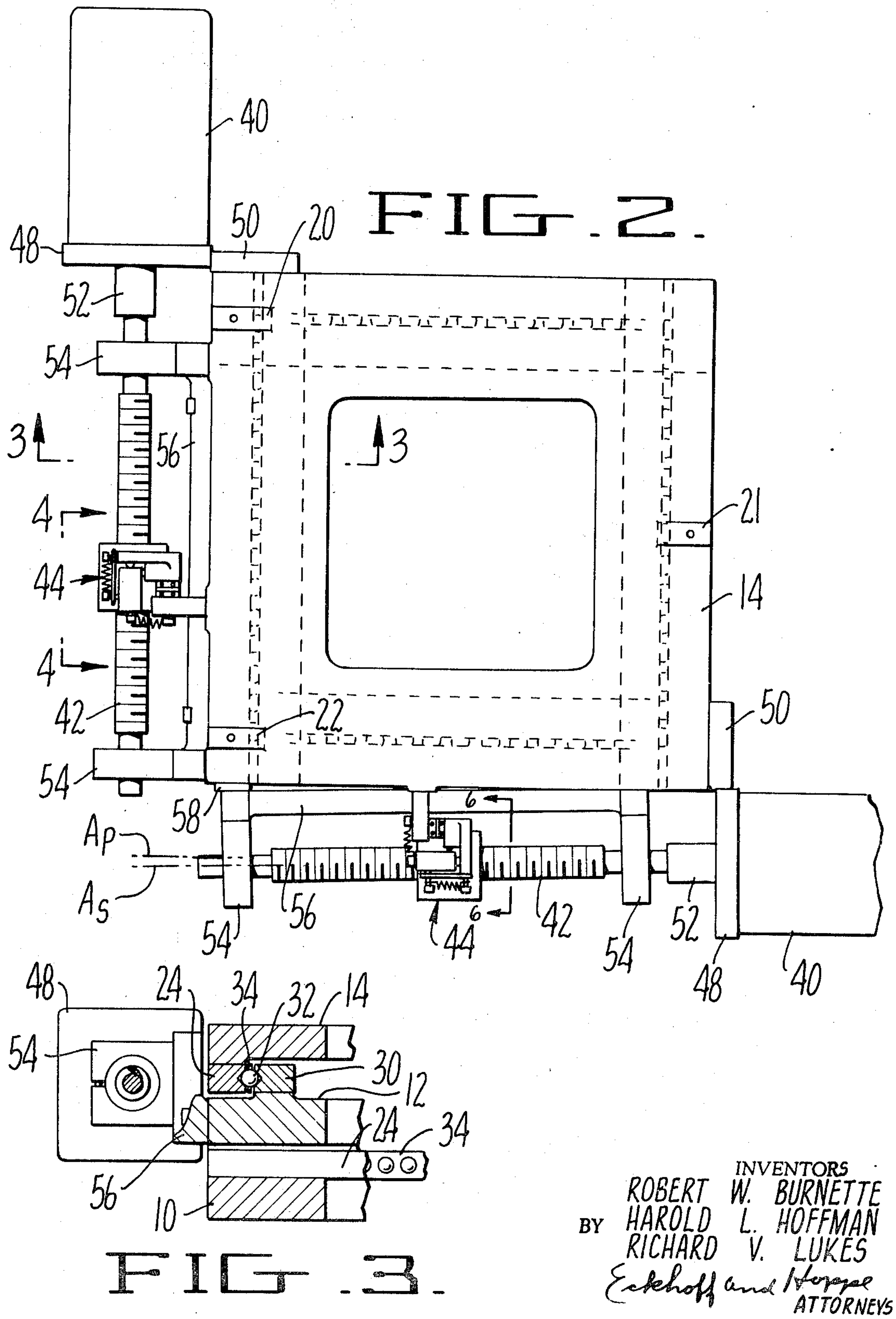
FIG. 2 is a plan view of the X-Y positioning table shown in FIG. 1, the axis of the lead screw being misaligned relative to the direction of stage travel, and with exaggerated misalignment for purposes of illustration.
FIG. 3 is a partial section taken on line 3—3 of FIG. 2.

First and second stage tables 12 and 14 are mounted for reciprocal travel in directions 16 and 18 by bearing mounts of conventional design. More particularly, a pair of outboard bearing rails 24 are secured to the underside of each stage, each bearing rail extending longitudinally in the direction of stage travel and parallel to its pair. The inner edge of each bearing rail is formed with a V-shaped groove 26 that matches a similar V-shaped groove 28 formed in a corresponding pair of bearing rails 30, one pair being secured to the upper surface of table 12. Grooves 26 and 28 are precision ground, lapped and hardened, and together they define a ball race for hardened and chromed steel balls 32. (See FIG. 3). A ball retainer 34 is employed to maintain balls 32 in spaced relation along the race.

Stages 12 and 14 are moved in directions 16 and 18, respectively, by means of a drive assembly comprising a motor 40, a lead screw 42, a follower assembly 44 and a yoke 46. Each motor is secured to a mounting ring 48 supported on an offset arm 50. One support arm is secured to base 10, the other being secured to first stage 12. A flexible coupling 52 connects the armature of each motor 40 to a lead screw 42, and each lead screw is rotatively mounted between a pair of bearing blocks 54 secured to a mounting bar 56, one bar being attached to base 10 and the other to first stage table 12.

At this point it should be noted that the axial alignment of each lead screw 42 is carefully set with respect to the direction of stage travel. In general, the axis of each lead screw is substantially parallel to the direction of travel of its associated stage. But the axis of each screw is set at a slight angle relative to the direction of travel as to compensate for cumulative lead errors in the screw. It will be readily apparent that this relationship may be produced by carefully machining the side of base 10 or table 12 to which mounting bars 56 are attached. Alternatively, a shim 58 of predetermined thickness may be inserted between one end of the mounting bar and the base or table in the manner shown in FIGS. 1 and 2. In either case an angular deviation is to be produced as suggested in FIG. 2 by the angle between "stage-parallel" axis line $A_p$ and the "-screw-set" axis line $A_s$.

It is to be understood that lead screws 42 may be and are preferably precision ground to great accuracy. Nevertheless, minor inaccuracies in both pitch and axial straightness may be tolerated because of the novel construction of follower assemblies 44 and yokes 46 which move the stages or tables in response to the turning of the screws. In addition, and as will become more clearly apparent, each follower assembly is rotated more or less, depending on the deviation angle of the screw axis, to effect a compensation for cumulative lead error in the screw.

Figure 5:
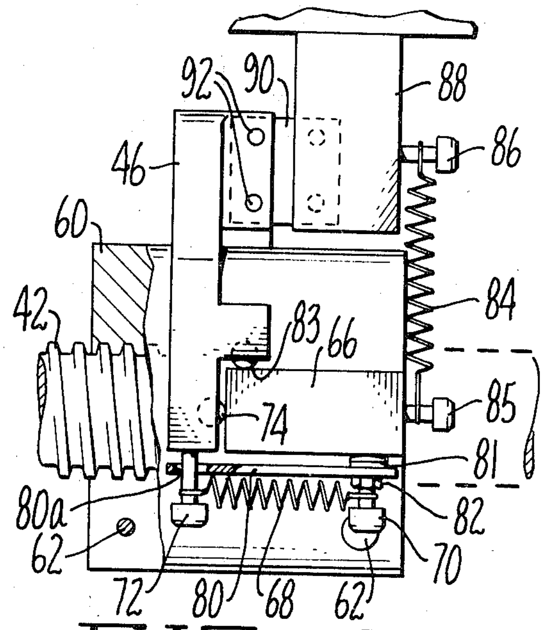
FIG. 5 is a plan view and partial section of the lead screw and follower assembly shown in FIG. 4.
Figure 4:
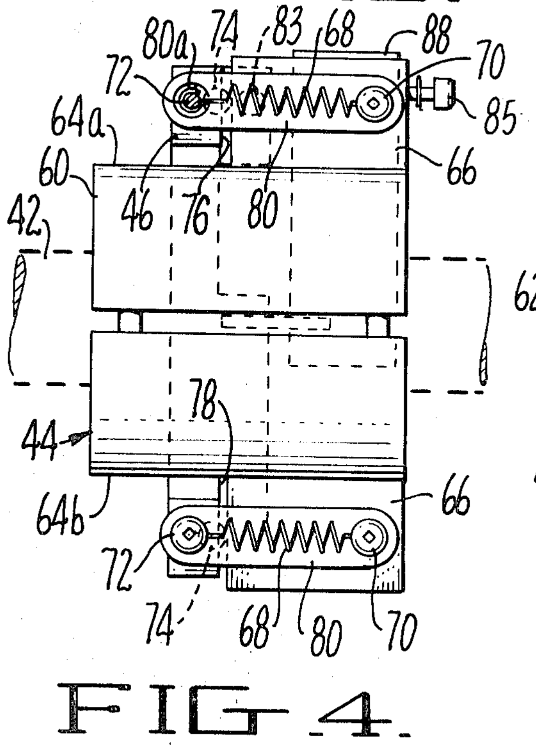
FIG. 4 is a side elevation of the lead screw and follower assembly taken on line 4—4 of FIG. 2.
Figure 6:
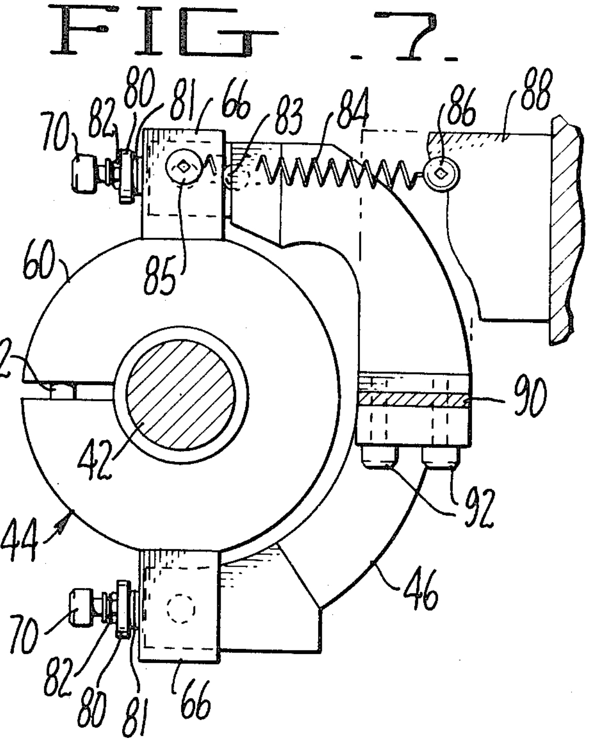
FIG. 6 is a vertical section and end view taken on line 6—6 of FIG. 2.

More particularly, and with reference to FIGS. 4–6, each follower assembly 44 comprises a cylindrical split sleeve 60 that is internally threaded to match the threads on lead screws 42. A pair of clamping screws 62 interconnect the split side of each sleeve 60 and provide means for adjusting the relative tightness between the sleeve and its supporting lead screw. A pair of flats 64*a* and 64*b* are machined at the top and bottom, respectively, of each sleeve, and these flats serve as locating surfaces for a pair of pressure pads 66 mounted to each sleeve by fasteners not shown. Helical springs 68 interconnect one arm of each yoke 46 with a pressure pad 66, one end of each spring being secured to a post 70 carried on the pressure pads, the other being attached to a post 72 carried on each arm of the yokes. The resilient force of springs 68 maintain contact between a pair of ball contacts 74, press fitted into recesses formed in the side faces 76 and 78 of the upper and lower yoke arms, and the side face of pressure pads 66. Thus, the moving force imparted to yokes 46 (and the equal and opposite reaction force against pads 66) are balanced on opposite sides of the screw axis $A_s$ and at equal radial distances from the screw axis. This arrangement avoids eccentric loading of the screw so that a relatively small turning force will operate the screw and follower assembly 44 with smoothness.

It will be readily apparent that the rotation of screws 42 in one direction will move sleeves 60 along the screws so that contact is made between ball contacts 74 and pressure pads 66, this being in a direction toward the left as shown in FIGS. 4 and 5. An opposite rotation of each screw will then move the sleeves in the opposite direction, thereby tending to move the supported sleeve away from yoke 46 and separate ball contacts 74 from their respective pressure pads. However, helical springs 68 impose a constraint which normally maintains contact between ball contacts 74 and pressure pads 66. In cases of rapid acceleration, the inertia of the moving stage mass could cause excessive separation between ball contacts 74 and pressure pads 66, and consequent overstressing of springs 68 if it were not for a pair of oblong links 80. One end of each link is rigidly attached to a post 70 by means of a standoff washer 81 and a nut 82. The other end of each link connects with slight lost motion to one arm of yoke 46, an opening 80*a* being formed in each link and through which post 72 projects.

When contact balls 74 are engaged against pressure pad 66, clearance exists between post 72 and opening 80*a*. This clearance is sufficient to allow a slight separation between the ball contacts and pads but not as much as would overstress helical springs 68. Thus, sleeve 60 may be moved rotationally and with translational movement relative to yokes 46 but yet without causing damage to springs 68.

In addition to ball contacts 74, one arm of each yoke 46 supports a ball contact 83 which defines a limiting point of rotation for follower assembly 44 as it is acted upon by the resilient force of a spring 84. The ends of springs 84 are secured between a pair of posts 85 and 86 attached to the upper pressure pad 66 and a mounting bracket 88 which supports the yoke from the stage. Referring to FIG. 6 in particular, posts 85 and 86 and ball contact 83 are located in approximately the same horizontal plane. In this way the resilient bias of spring 84 imposes a force that is balanced by an equal and opposite force of contact between the ball contact 83 and the side surface of upper pressure pad 66.

Each yoke 46 is mounted from bracket 88 by a horizontally disposed leaf spring 90, the ends of the leaf spring being received in slots formed in bracket 88 and yoke 46, respectively, and held thereto by setscrews 92. It is to be noted that leaf springs 90 resiliently supports its yoke 46 in a horizontal plane passing through the axis of the lead screw. Accordingly, yokes 46 may be moved against the resilient force of the leaf spring in the vertical direction and, thereby, accommodate the inaccuracies of a bowed lead screw without creating a binding of parts.

FIG. 7 of the drawings illustrates best the particular manner in which inaccuracies in cumulative lead error may be corrected by setting the axis of the lead screw ($A_s$) at a slight angle relative to the direction of stage travel ($A_p$). As an example, and with the understanding that FIG. 7 is an exaggeration of the axial displacement of the lead screw, it will be noted that ball contact 83 represents a stop point that limits rotation of the follower assembly 44 under all conditions. If we now further assume that the axis of the lead screw passes through the point 94 at one end and the point 96 at the other end, then it will be apparent that a rotation will be imparted to sleeve 60 by spring 84 as the follower assembly moves from point 94 to point 96. This rotation is, of course, controlled by the angular deviation of the lead screw axis relative to the direction of travel. Proper selection of that angle will compensate for cumulative positive or negative lead errors in any given lead screw.

As an example, and assuming that the lead screws employed advance the follower sleeve 60 1 inch for every five turns (0.2 inches for each complete revolution), then an angular deviation which produces a 1° rotation of the follower will produce a further advancement (or backoff) of 0.000555. Thus, should the lead screw have a cumulative lead error of 0.000555 over a 6-inch travel, the lead screw should be purposely set at an angle relative to the direction of stage travel to create a 1° rotation of the follower sleeve. Although this setting may be arrived at by trial and error methods, the angular deviation may also be mathematically computed with great accuracy.

As a further example, and if we assume that the radial distance from the axis of the lead screw to the point of contact between ball contact 83 and pressure pad 66 is a distance of 1 inch and the angle of sleeve rotation is 1°, then the distance from point 94 to point 96 is approximately equal to the sine of 1° times 1 or 0.0175 inch. Therefore, the surfaces to which mounting bar 56 are secured should be machined to produce an axial displacement of this amount for each 6 inches between the mounting centers of bearing blocks 54. As previously indicated, however, the same result can be accomplished by selecting a shim 58 of the necessary thickness to produce the same angular deviation.

Although a preferred embodiment of the invention has been illustrated and described, various modifications and changes may be resorted to without departing from the spirit of the invention or the scope of the attached claims, and each of such modifications and changes is contemplated.

What is claimed is:

1. In a precision positioning table comprising a base and at least one movable stage, a lead screw mounted to said base, a follower threadably engaged with said lead screw, means for guiding said movable stage in a direction of stage travel substantially parallel to but slightly at an angle relative to the axis of said lead screw, means including a first contact mounted to said stage, means including a second complementary contact mounted to said follower, and resilient biasing means for retaining said second contact into engagement with said first contact and maintaining such engagement as said follower is moved axially along said lead screw, the angle between the axis of said lead screw and the direction of stage travel producing a slight rotation of said follower that compensates for the cumulative lead error of said screw.

2. The precision positioning table of claim 1, and further comprising means for adjusting the angle between the axis of the lead screw and the direction of stage travel.

3. The precision positioning table of claim 1, said resilient biasing means imposing a force that is balanced by an equal and opposite force of contact between said first and second contacts.

4. The precision positioning table of claim 1, said means including a first contact comprising a yoke mounted to said stage, one arm of said yoke supporting a bearing that engages the second contact on said follower in a direction transverse to the axis of said lead screw.

5. The precision positioning table of claim 4, and further comprising resilient means interconnecting said yoke to said stage that provides vertical resiliency of movement therebetween.

6. The precision positioning table of claim 5, said resilient means comprising a leaf spring connected to said yoke in the horizontal plane through the axis of said lead screw, said leaf spring allowing said yoke to be moved vertically up or down relative to the axis of said lead screw but imposing a bias tending to return the yoke to a neutral position.

7. The precision positioning table of claim 1, said means including a first contact comprising a yoke mounted to said stage, said yoke having a pair of arms extending around said follower to points on diametrically opposite sides of said lead screw, bearing means disposed intermediate each arm of said yoke and said follower that provide relatively free movement between the yoke and follower in a direction transverse to the axis of said lead screw.

8. The precision positioning table of claim 7, said bearing means comprising upper and lower contacts that engage a pair of upper and lower pressure pads, respectively, said pressure pads being mounted to said follower, one of said pressure pads having a machined surface that provides said second complementary contact, and means resiliently biasing said upper and lower contacts into engagement with said pressure pads.

9. The precision positioning table of claim 8, and further comprising stop means for limiting relative translatory separation of said upper and lower contacts from said pressure pads.

10. The precision positioning table of claim 9, said stop means comprising a pair of links, one end of each link being attached to a pressure pad, the other end of each link being connected to one arm of said yoke and with clearance that provides limited separation.

11. In a precision positioning table comprising a base and at least one movable stage, a lead screw mounted to said base, a follower threadably engaged with said lead screw, means for guiding said movable stage in a direction of stage travel substantially parallel to the axis of said lead screw, a yoke mounted to said stage, said yoke having a pair of arms extending around said follower to points on diametrically opposite sides of said lead screw, upper and lower contacts formed on said pair or arms, respectively, a pair of upper and lower pressure pads mounted to said follower, means resiliently biasing said upper and lower contacts into engagement with said pressure pads, and stop means for limiting relative separation of said upper and lower contacts from said pressure pads.

* * * * *